A. ELIJAH.
Binders' Platforms for Harvesters.
No. 5,945. Reissued June 30, 1874.
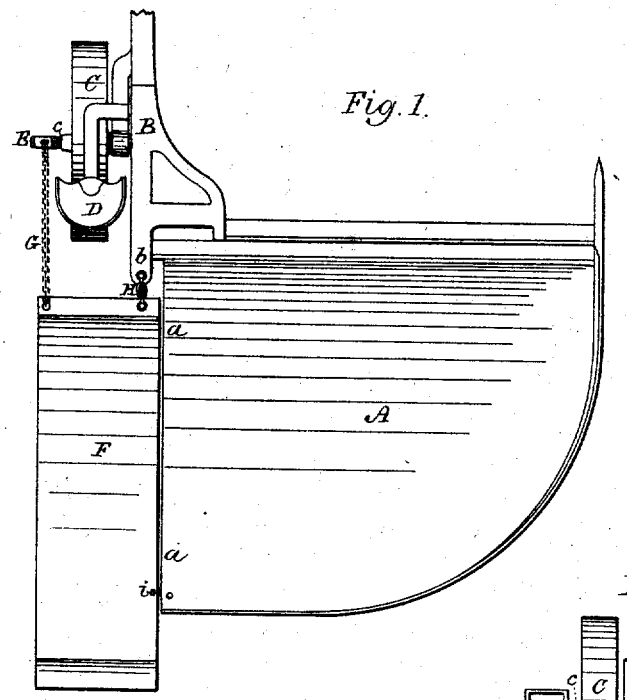
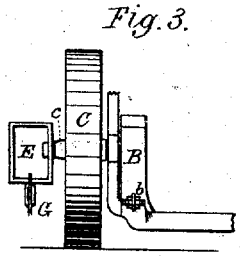
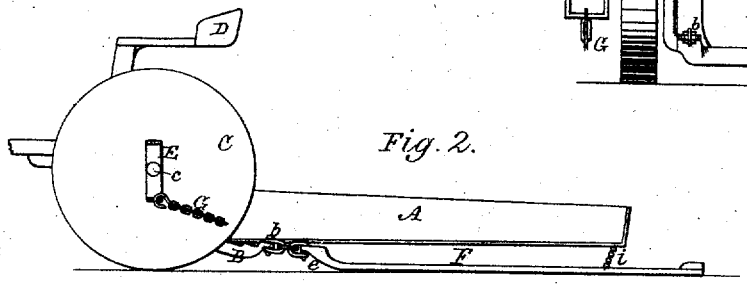
Witnesses
Jno. D. Patton
Edmund Masson
Inventor.
Allen Elijah,
By atty A. B. Stoughton.
AM. PHOTO-LITHOGRAPHIC Co. N.Y. (OSBORNE'S PROCESS.)

UNITED STATES PATENT OFFICE.

ALLEN ELIJAH, OF CLARENCE, IOWA, ASSIGNOR OF ONE-HALF INTEREST TO D. M. OSBORNE & CO., OF AUBURN, N. Y.

IMPROVEMENT IN BINDERS' PLATFORMS FOR HARVESTERS.

Specification forming part of Letters Patent No. 147,378, dated February 10, 1874; reissue No. 5,945, dated June 30, 1874; application filed June 8, 1874.

*To all whom it may concern:*

Be it known that I, ALLEN ELIJAH, of Clarence, in the county of Cedar and State of Iowa, have invented certain new and useful Improvements in Binders' Stands or Platforms for Self-Raking Reapers; and I do hereby declare the following to be a full, clear, and exact description of the same, reference being had to the accompanying drawings making a part of this specification, in which—

Figure 1 represents a top plan of so much of a harvesting-machine as will illustrate my invention. Fig. 2 represents a side elevation of the same, and Fig. 3 represents a front elevation of that portion of the reaper with or to which the binder's stand is connected.

Binders' stands or platforms have been connected to or with reaping-machines in various ways; but they have been either placed on or suspended to the machine, so that the weight of the stand or platform, as well as that of the binders thereon, is sustained on the main frame of the machine, or they have been supported independently of the main frame upon wheels running upon the ground. I lay no claim to any of these stands or platforms so sustained or carried.

My invention consists in a binder's stand or platform that slides over or upon the ground or stubble "sled-fashion," and connected to the main frame of the machine by flexible connections, which, while allowing the stand or platform and the weight of the binders upon it to rest upon the stubble or ground, draw it along and keep it in place when the machine is advancing or turning around. Such sled-fashioned platform in sliding over the ground runs comparatively smooth, as it only touches the highest elevations, and glides easily over them, while wheels would drop into all the depressions and mount all of the elevations in the line of their path, and create such jars and shocks as to require some kind of bracing for the riders thereon, and which a sled does not require.

To enable others skilled in the art to make and use my invention, I will proceed to describe the same with reference to the drawings, which represent the sliding stand or binders' platform as attached to what is known as the "Kirby machine or reaper."

A represents a platform, over which works a sweep-rake that makes a side delivery at *a*, and B is the main frame, to which the platform is connected, said main frame being supported on and carried by the main wheel C. The driver's seat is shown at D, and is supported on the main frame. This main frame B has a rear projection, *b*, upon it, and it also carries the axle or journal *c*, upon which the main wheel revolves. E is a foot-support for the driver, attached to the point of the journal *c*. As the projection *b*, journal *c*, and foot-support E are all rigidly attached to the main frame, they practically constitute a part of that frame. F is the binders' stand or platform, which is rounded up in front, as at *e*, and otherwise constructed sled-fashion. This stand or platform F rests upon the ground, and is connected to the main frame or to some part or piece that is attached to the main frame by means of chains G H, by which it is drawn over, while resting upon, the ground. Toward the rear of the stand or platform F there is another flexible or chain connection, as at *i*, to keep said stand in proper position when the reaping-machine is being turned around. This connection at *i*, like the others at G H, in nowise prevents the weight of the stand and the binders upon it from resting upon the ground.

The binders' stand or platform F occupies the whole of the delivery side of the grain-table A, and, as shown, may extend somewhat farther rearward than the rear portion of the grain-table, making its length, together with its width, as shown, sufficient to accommodate two binders, and, being unobstructed by seats, supports, or anything of the kind, the binders have free space in which they can work and deliver the bundles of grain or gavels upon the ground.

When the binders' stand is not required, there are three chains to unhook, and it is entirely detached.

Having thus fully described my invention, what I claim is—

In combination with the main frame and grain-table of a reaping-machine, the sled-shaped binders' stand or platform, connected to said main frame by flexible connections, which permit said stand or platform while being drawn along to be supported upon the ground independent of the main frame, and to slide over the stubble, as and for the purpose described and represented.

ALLEN ELIJAH.

Witnesses:
JOHN MCLEOD,
S. M. WEST.